United States Patent
Deane et al.

(10) Patent No.: US 9,766,145 B2
(45) Date of Patent: Sep. 19, 2017

(54) ACTIVE DIAPHRAGM SEAL ASSEMBLY FOR PRESSURE MEASUREMENT

(71) Applicant: WIKA Alexander Wiegand SE & Co. KG, Klingenberg (DE)

(72) Inventors: Jason Deane, Houston, TX (US); Giovanni Filippi, Cypress, TX (US); Albrecht Kalisch, Gross-Heubach (DE)

(73) Assignee: WIKA Alexander Weigand SE & Co. KG, Klingenberg (DE)

( * ) Notice: Subject to any disclaimer, the term of this patent is extended or adjusted under 35 U.S.C. 154(b) by 187 days.

(21) Appl. No.: 14/791,380

(22) Filed: Jul. 3, 2015

(65) Prior Publication Data

US 2017/0003184 A1    Jan. 5, 2017

(51) Int. Cl.
*G01L 13/02* (2006.01)
*G01L 7/08* (2006.01)
*G01L 19/00* (2006.01)

(52) U.S. Cl.
CPC .......... *G01L 7/082* (2013.01); *G01L 19/0046* (2013.01)

(58) Field of Classification Search
CPC ......... G01L 13/025; G01L 7/00; G01L 7/082; G01L 19/0046; G01B 7/18; G01B 5/30
USPC ........................... 73/716, 715, 700, 763, 760
See application file for complete search history.

(56) References Cited

U.S. PATENT DOCUMENTS

| | | | | |
|---|---|---|---|---|
| 4,543,832 A | * | 10/1985 | Van Over | G01L 9/006 277/644 |
| 2002/0017143 A1 | * | 2/2002 | Burczyk | G01L 13/025 73/716 |
| 2010/0058874 A1 | * | 3/2010 | Dannhauer | G01L 19/0046 73/717 |

* cited by examiner

*Primary Examiner* — Lisa Caputo
*Assistant Examiner* — Nigel Plumb
(74) *Attorney, Agent, or Firm* — Muncy, Geissler, Olds & Lowe, P.C.

(57) ABSTRACT

A fluid filled pressure measurement system having a pressure sensor or pressure gauge and a diaphragm seal to a process wherein the diaphragm seal is moveable by changing the volume behind the diaphragm seal by the volume member. In a first position the diaphragm seal is seated or is a parked position such that the diaphragm seal is fixed to avoid deformations during cleaning.

25 Claims, 9 Drawing Sheets

ACTIVE DIAPHRAGM SEAL ASSEMBLY FOR PRESSURE MEASUREMENT

BACKGROUND OF THE INVENTION

Field of the Invention

The present invention relates to a fluid filled pressure measurement assembly which is covered by a diaphragm seal.

Description of the Background Art

Fluid filled pressure measurement assemblies are useful to protect a measurement channel system from dirt, debris, viscous clogging, high temperature etc., coming into a dead end, where the pressure sensor or gauge is connected to. A diaphragm seal avoids contamination from former production charges into food processes where pressure has to be measured very precisely, for example, as in breweries or dairies or creameries. The pressure channel system is filled with a fluid which transfers the pressure from the process via the diaphragm to a sensor or to a gauge.

The conventional diaphragm seals, however, have problems in that the diaphragm seal could be damaged during cleaning, startup, shutdown, etc., especially because of the pressure filling oil behind the delicate and thin foil design of the diaphragm in low pressure applications does not provide enough support. Therefore any contact from a jet of water produced from the cleaning units could damage the diaphragm seal during a cleaning process, and thereby the pressure filling fluid can contaminate the food processes.

SUMMARY OF THE INVENTION

It is therefore an object of the present invention to provide a measurement assembly wherein the diaphragm seal is moveable by changing a volume behind the diaphragm seal by an active member, especially for cleaning, the diaphragm seal can be set, for example rigidly, in a shaped seat, parking position that is in a similar shape as the diaphragm seal itself. The seal could be then cleaned without any damage. Also for measurement adjustment a movement of the seal in a special position could be helpful to drive the diaphragm seal in a position where an inner stress is minimized and optimum pre-size pressure measurement is possible.

Thus, in an embodiment, a movable diaphragm is provided to set the diaphragm in a predetermined and optimized position for precise measurement and to allow to set the diaphragm to its seat for secure parking during cleaning of the process containment.

In an embodiment, a bed seat can be formed in a same shape as the diaphragm, which can be called a "first member" that is connected to the fluid filled channel system.

A second active volume member, such as a piston or a second diaphragm is installed in the hydraulic pressure system between the process diaphragm and the pressure sensing device.

It is also possible to use an active volume member inside the fluid system, such as a piezo device, which changes its volume under different voltages, or a bellow with an external pressure control or a wax element, wherein the volume is modified via temperature by heating or cooling.

In an embodiment, the fluid measuring system can be controllable via an active volume member, which can be a second diaphragm or a piston that is driven by an external controlled source.

During an exemplary operation, the second active member, e.g. a diaphragm, is seated against its bed via an external source, via a pneumatic, hydraulic or mechanic force. It seals itself off from the rest of the system by not allowing the system fill fluid to enter the second diaphragm cavity.

In this exemplary "ACTIVE" operation mode, all pressure from the process diaphragm is transmitted to the pressure sensing device, which could be a pressure sensor or a pressure gauge.

In an embodiment, the front diaphragm seal is adapted to be moved. This movement can, for example, optimize a correct measurement, because the actual measurement is also influenced by an inner stress of the diaphragm seal. The force of the inner stress creates pressure differences over the fluid system to the sensor or gauge and can cause a difference to the correct measurement.

Therefore an optimized position of the diaphragm seal with an optimized volume between the seal and seat is important for precise measurement with less influence from the diaphragm seal itself, and because of this reason an adjustable volume behind the diaphragm seal is needed to provide an accurate measurement assembly.

In an embodiment, and, for example, for a cleaning process it is desirable to move the diaphragm seal completely to its seat, because with fluid behind the seal the diaphragm seal could be destroyed or deformed during cleaning, especially by using powerful water jet cleaning devices, and after this a correct measurement would not be possible.

By seating the diaphragm seal in its seat/bed by pumping the fluid out of the space between the diaphragm seal and its seat, the diaphragm seal is supported by its bed, especially when the shape of the seat is equal to the shape of the diaphragm seal. By seating the diaphragm seal in its seat no deformations are possible anymore, thereby protecting the diaphragm seal, for example, from tearing during a cleaning process.

In an event that a cleaning cycle or other non-standard operation is required in the process environment, the second active volume member can be operated. Under these conditions the second active volume member is drawn away from its normal position, which will pull the system fill fluid out from behind the process diaphragm and draw the process diaphragm into its seat.

The second volume member can be operated in many ways, as there are the direct mechanical solution out of a piston in a cylinder, or a flexible diaphragm which is driven mechanically or by air pressure or vacuum. The mechanical drive can be, for example, strokes generated by pistons which are driven by hydraulic, pneumatic or electric power.

With the process diaphragm seated rigidly against the housing, i.e. its seat, it cannot be flexed and fatigued by wash cycles, inadvertent steam pressure spikes, etc.

Upon completion of a wash cycle or maintenance, the second diaphragm is returned to its original position, or a seated position. When the hydraulic system is completely sealed, the volume remains consistent and instrument accuracy is maintained.

This could be also optimized by a valve which is located at the entry to the second active volume member, which could be closed to eliminate also small volume shiftings or measurement losses caused by temperature or expansion which may create a quality loss at the sensor or gauge.

According to an embodiment of the invention, a pressure measurement system can include: a pressure channel system fillable with a fluid; a pressure sensor or pressure gauge; a first diaphragm seal arranged between a process and a seat formed in or connected to a flange, a cavity being formed between the first diaphragm seal and the seat when the pressure measurement system is in an active operation; and a volume member adapted to push or suck fluid from the cavity towards the pressure channel system, wherein the diaphragm seal is moveable by displacing the fluid behind the diaphragm seal by the volume member According to an embodiment, the diaphragm seal is set in a shaped seat by the volume member to avoid deformations during cleaning.

According to an embodiment, the volume member is a second diaphragm which is drivable by pressure or vacuum.

According to an embodiment, a predetermined, preferably optimized working position of the diaphragm seal is defined by a specified pressure, force or a specified piston position from the volume member.

According to an embodiment of the invention, a pressure measurement system comprises: a pressure channel system filled with a pressure fluid; a pressure sensor connected to the pressure channel system and providing a pressure measurement of a process in a process containment based on a pressure of the pressure fluid, the pressure channel system being connected to the process containment via a first channel; a first diaphragm seal arranged between the process and the first channel; and a second diaphragm seal arranged in a second channel, which can be connected to the first channel or a cavity formed behind the first diaphragm seal, arranged between the pressure sensor and the process containment, wherein in a first mode, the second diaphragm seal is moved into a first position thereby moving the first diaphragm seal via the pressure fluid into an active position such that the pressure sensor obtains a pressure reading of the process in the process containment, and wherein in a second mode, the second diaphragm seal is moved into a second position thereby moving the first diaphragm seal via the pressure fluid into a parked position such that the first diaphragm seal is held against a seat formed between the first channel and the process containment, the seat having a majority of its area shaped corresponding to a shape of the first diaphragm seal.

According to an embodiment, a flange fixedly holds the seat to the first channel.

According to an embodiment, the flange is formed between the process containment and the first channel, and wherein the seat is formed in the flange.

According to an embodiment, a shut-off valve is formed in the second channel between the second diaphragm seal and the first channel, the shut-off valve isolating the second diaphragm seal from the first diaphragm seal and the pressure sensor.

According to an embodiment, a cylinder assembly, based upon an activation, moves the second diaphragm seal from the second position to the first position or from the first position to the second position.

According to an embodiment, the cylinder assembly includes a piston and a piston rod, the piston rod connecting the piston to the second diaphragm seal, and wherein the piston is moveable within the cylinder assembly to be in the first position or the second position.

According to an embodiment, a switch operatively engaged with a movement of the second diaphragm seal initiates a zero setting of the pressure sensor upon an activation thereof.

According to an embodiment, a time delay is set prior to the initiating of the zero setting of the pressure sensor such that upon initiating the zero setting, the second diaphragm seal is fully seated in the first position.

According to an embodiment, the time delay substantially corresponds to an amount of time required for the second diaphragm seal to traverse from an activation of the switch to being fully seated in the first position.

According to an embodiment, a stop activates the switch, and wherein the stop is arranged on a pushrod that is operatively engaged with the second diaphragm seal.

According to an embodiment, the process containment is a process containment for, for example, a brewery, dairy, chemical plant, refinery, creamery, etc.

According to an embodiment, the second diaphragm seal is moved from the first position to the second position or the second position to the first position based on a pneumatic or hydraulic force.

According to an embodiment, the pressure channel system is completely sealed.

According to an embodiment, the pressure fluid contained in the pressure channel system directly contacts a surface of the first diaphragm seal and a surface of the second diaphragm seal.

According to an embodiment, the first diaphragm seal and the second diaphragm seal are each connected to a first flange and a second flange, respectively, only in an area of an outer circumference of the first diaphragm seal or second diaphragm seal.

According to an aspect of the invention, a pressure measurement system comprises: a pressure channel system for transmitting a fluid pressure to a pressure sensor or pressure gauge, a diaphragm for fluidly separating the pressure channel system from a process area, the diaphragm being seatable to a seat located opposite to a side of the diaphragm facing to the process area, a volume adjusting member which is fluidly connected to the pressure channel system and arranged for adjusting an amount of fluid in the pressure channel system, wherein the diaphragm is moveable by displacing the fluid in the pressure channel system by the volume adjusting member.

According to an embodiment, the diaphragm comprises a seal seatable to a seat by reducing the volume in the pressure channel system by the volume adjusting member.

According to an embodiment, the volume adjusting member includes a movable volume adjusting diaphragm, which is preferably movable by applying pressure to the volume adjusting diaphragm.

According to an embodiment, an optimized working position of the diaphragm in relation to the seat is adjustable by displacing the fluid in the pressure channel system.

According to an embodiment, a surface of the diaphragm facing to the seat is provided with a predetermined surface contour.

According to an embodiment, the system further comprises a control unit for controlling the volume adjusting member or volume member such that the diaphragm is set into a parking position in which the diaphragm is seated against the seat based on the detection of a predetermined pressure being exceeded in the process area or containment, the predetermined pressure being preferably determined in advance and stored in a storage device.

The invention is not limited to normal pressure measurement, it is also applicable to differential pressure systems, which compare two pressures e.g. also with two diaphragm to a process.

One application of such differential pressure arrangement could be a container with liquid gas, which is in the top of the containment filled with gas under pressure. The liquid level of the container could then be determined by using the difference of the two pressure values via two pressure connections using diaphragms, one at the top and one at the bottom of the containment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
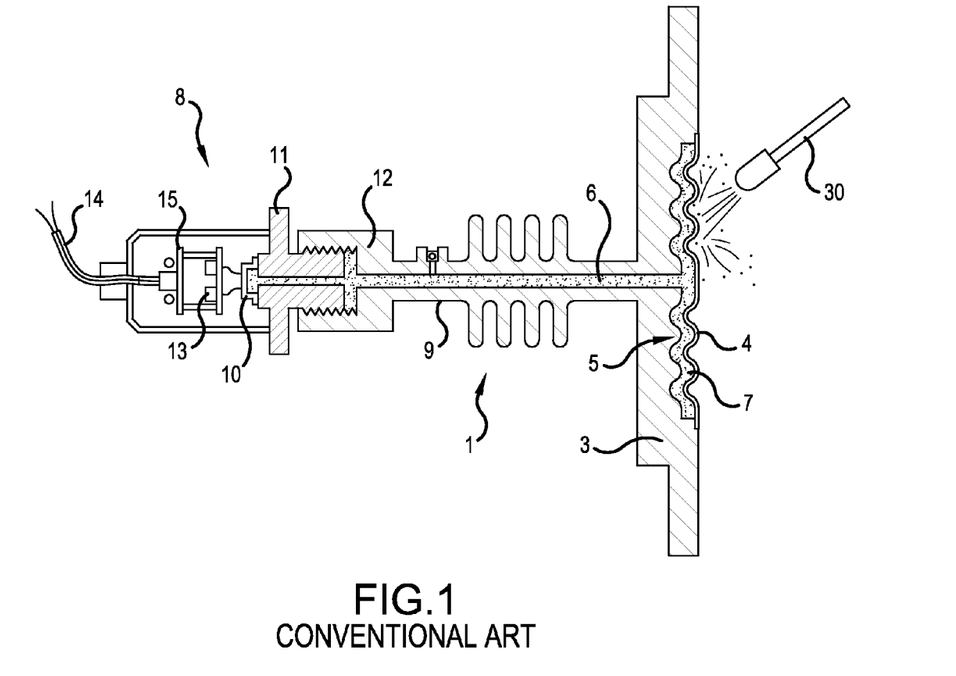
FIG. 1 illustrates a conventional diaphragm seal assembly.

FIG. 1 shows a conventional diaphragm seal assembly that has a flange 3 that has a diaphragm seal 4 with a seat 5 that is welded to the flange 3. A bore 6 links the cavity 7 between the diaphragm seal 4 and the seat 5 to a pressure measurement device 8 via a tube 9.

The pressure measurement device 8 can be, for example, a pressure sensor 10 that is connected to the tube 9 by an adapter 11 that is screwed into a connection part 12, which is a part of the tube 9. The pressure measurement device 8 also has an electronic measurement circuit 13 arrange in a housing 15 that provides measurement data via a cable 14 to an external device, for example, a display or process control center.

By filling the system with a fluid, such as silicone oil, a pressure given from the process to the diaphragm seal 4 is transferred by the fluid and through the bore 6 to the pressure measurement device 8.

Figure 2:
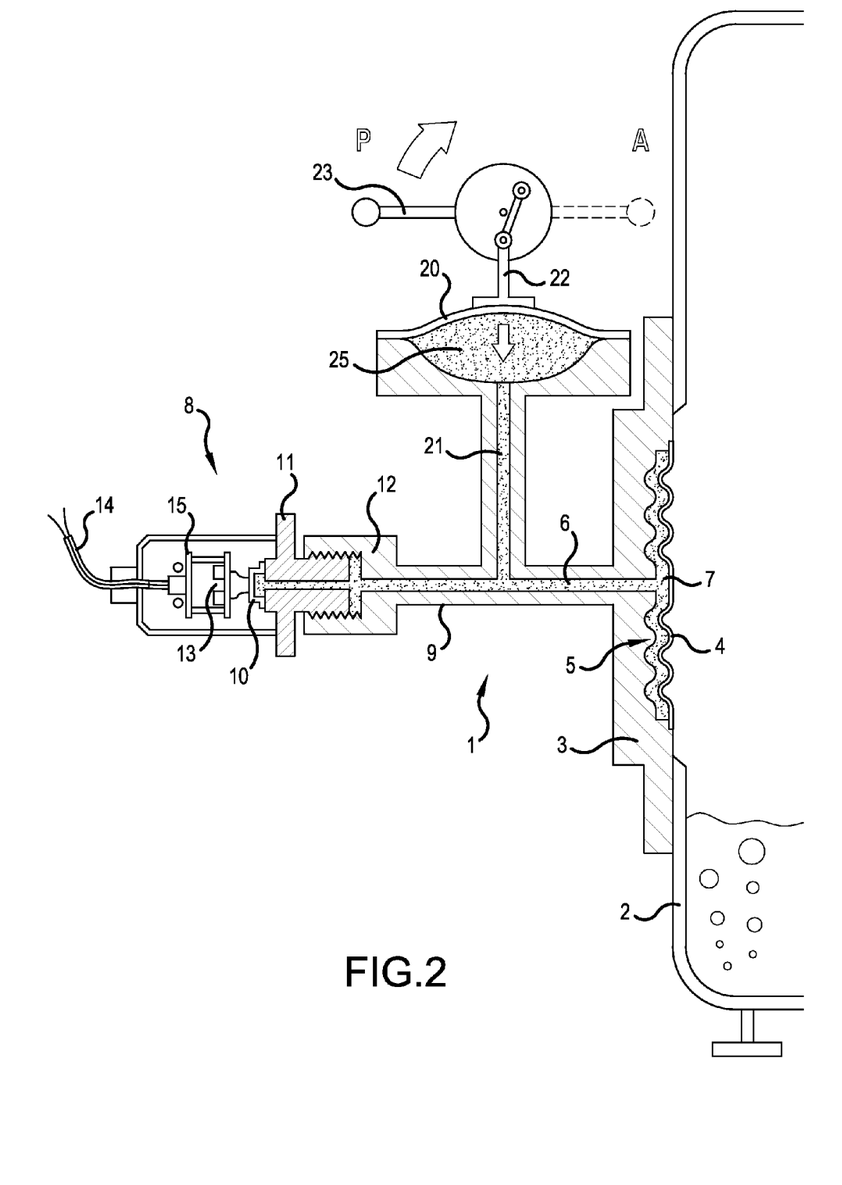
FIG. 2 illustrates a diaphragm seal assembly according to an embodiment of the present invention.

In FIG. 2, an exemplary diaphragm seal assembly 1 according to an embodiment of the present invention is illustrated. The diaphragm seal assembly 1 is connectable to a process containment 2, for example, a brewery process for beer. One skilled in the art understands that the process containment 2 can also be various other containment systems whereby pressure readings are desirable.

A flange 3 is sealed assembled to an opening formed in the process containment 2. The flange 3 has a diaphragm seal 4 with a seat 5 arranged between a portion of the flange 3 and the opening of the process containment 2, with the seat 5 being connected or integrated to the flange 3 by, for example, welding. A bore or first channel 6 links a cavity 7 between diaphragm seal 4 and the seat 5 to a pressure measurement device 8 via a tube 9.

A second active volume member is connected to the fluid filled pressure measurement system. The second active volume member can be, for example, a second diaphragm 20 that is linked to the fluid filled bore 6 via a second channel 21.

A small pushrod 22 is affixed to the back of the second diaphragm 20 and is connected to a lobed lever 23. The lobed lever 23 can be moved such that the second diaphragm 20 is moved mechanically between a seated (parking) P position and an operating (active) position A. By moving the lever 23 from P to A, a specified and predetermined volume is pressed into the second channel 21 of the pressure measurement system. The first diaphragm seal 4 is thereby pushed out of its seat 5 into a working position. After this, the pressure measurement system is active and a zero point of the sensor 10 is reset by "setting zero" at the electronic circuit 13 via a switch or via an external configuration over the data cable 14. In the position Parking "P" of the lever, substantially all of the fluid behind the first diaphragm seal 4 would be pulled into the working cavity 25 such that the first diaphragm seal 4 is held onto the seat 5 and is thereby protected during a cleaning operation from, for example, a pressure washer or water jet cleaning devices 30 as illustrated in FIG. 4.

Figure 3:
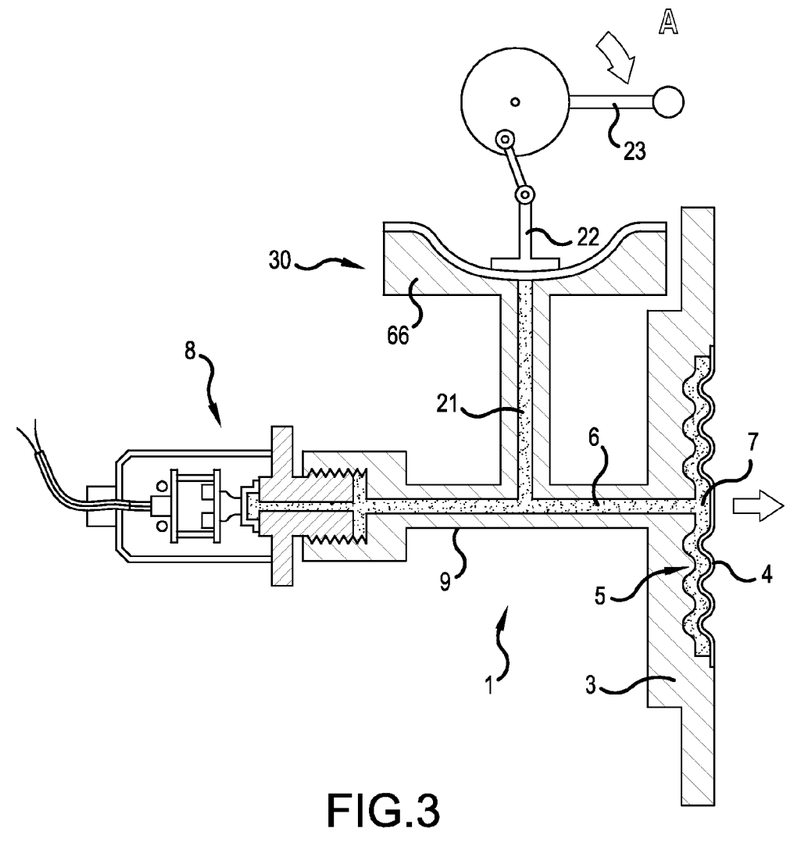
FIG. 3 illustrates the diaphragm seal assembly in an active mode.

In FIG. 3, the diaphragm seal assembly 1 is shown in the active mode A. By turning the lever 23 in an operating (active) position A the volume of fluid contained in the working cavity 25 of the active member 30 is pressed into the channel system via channel 21 and bore 6 and in the cavity 7 between the first diaphragm seal 4 and its seat 5 so that the first diaphragm seal 4 is thereby pushed out of its seat 5 into a working position where a process pressure is accurately and precisely provided to a sensor assembly 8 via the fluid filled channel system.

Figure 4:
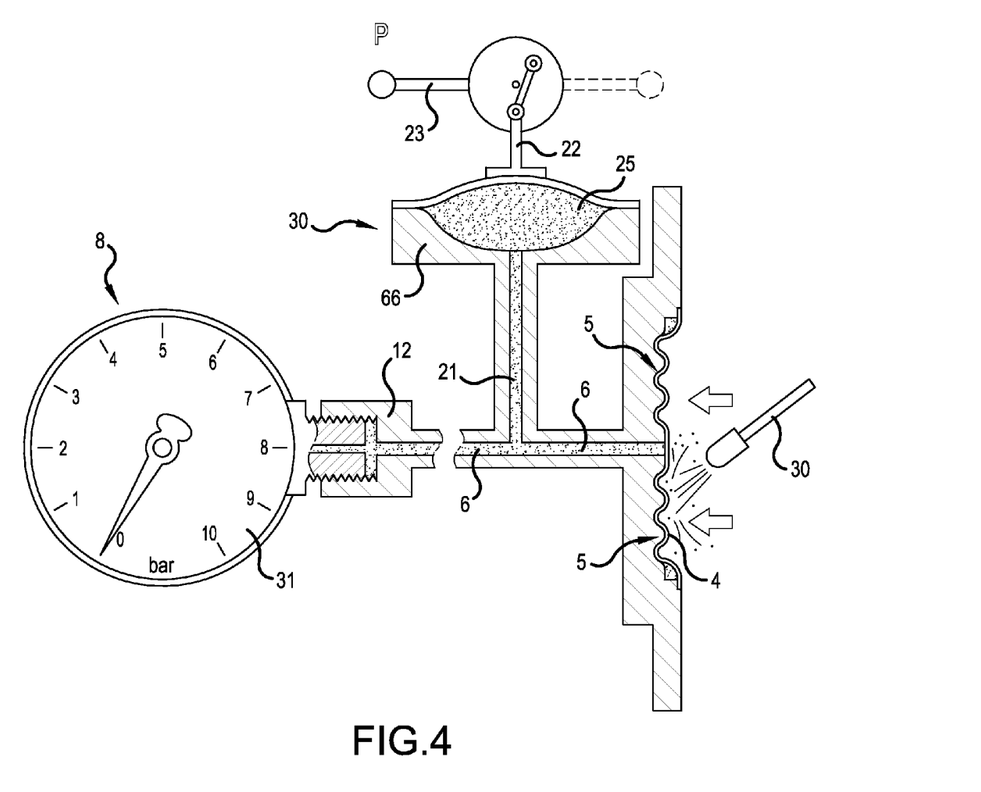
FIG. 4 illustrates the diaphragm seal assembly in a parking mode.

In FIG. 4, the diaphragm seal assembly 1 is shown in the parking mode P. By turning the lever 23 in a passive (parking) position "P" all fluid behind the first diaphragm seal 4 is vacuumed into the working cavity 25 of the second active volume member assembly 30 and the first diaphragm seal 4 is fixedly held to the seat 5 via the negative vacuum pressure. The seat 5 can have the substantially the same shape as the diaphragm seal 4 itself such that the diaphragm seal 4 is protected during a cleaning process by water jet cleaning devices 30 or other cleaning devices. The first diaphragm seal 4, however, can also have a slightly different shape than the seal 5, depending on the application required.

In an exemplary embodiment, the pressure in the process containment in the operation of the system is monitored by a designated control device. The control device compares the pressure measured by the sensor or gauge 10 or even by a designated further sensor (not shown) with a predetermined value which can be set in advance and stored in a storage device, i.e. a memory. In case that the control device detects a pressure value in the process containment 2 that exceeds the predetermined value stored in the storage device in advance, the diaphragm seal 4 is set to a parking position in which the diaphragm seat 4 is seated against the seat 5. This can be achieved by controlling the volume member in an active manner such that the fluid in the channel system is displaced until the parking position of the diaphragm seat 4 is achieved.

Such a control strategy can be used to protect the diaphragm seal 4 from failure in operational conditions in which the maximum pressure in the process containment 2 is exceeded as the stability of the rather thin diaphragm seat 4 is improved by the seating to the seat 5. In particular, a corresponding automatic control can protect the diaphragm seal 4 and failures due to broken or torn diaphragm seals 4 caused by exceeding the maximum pressure can be avoided as much as possible.

In this exemplary embodiment, the pressure measurement system 8 is a bourdon pressure gauge 31 that is connected to the connection part 12 of the fluid channel system in a sealed manner. It is also noted that the connection to the pressure gauge is extendable via a capillary tube connection.

Figure 5:
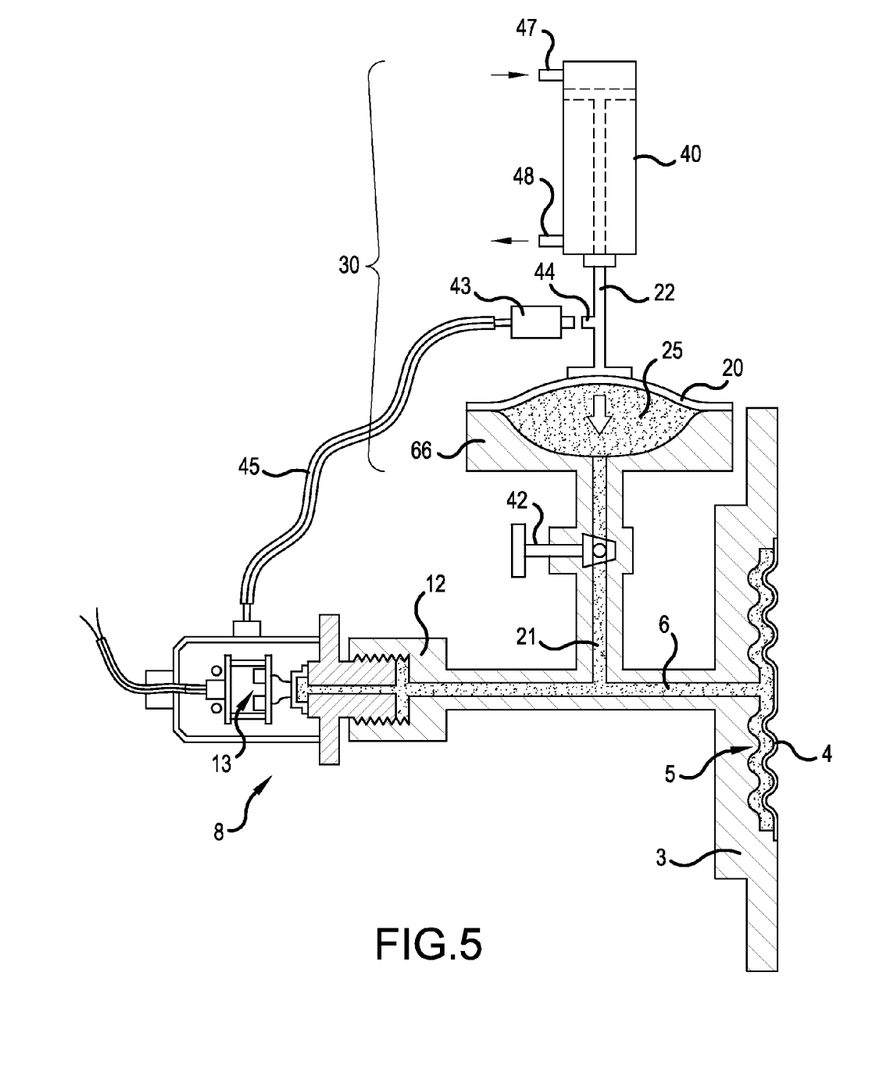
FIG. 5 illustrates the diaphragm seal assembly according to an embodiment of the present invention.

FIG. 5 illustrates a further exemplary embodiment in that the active volume member 30 is controlled by a cylinder 40 which is driven by a pneumatic or hydraulic force via inlet 47 and outlet 48.

A stroke of the piston/cylinder assembly engages the pushrod 22 that is affixed to the back of the second diaphragm 20. Thus, by providing pressure into inlet 47 of cylinder 40, fluid from the working cavity 25 will be pressed by the second seal 20 in to the cavity 7 formed behind the first diaphragm seal 4. A shut off valve 42 in channel connection 21 can be closed so that no influence during pressure measurement is possible from the active volume member 30, such as temperature related volume expansion of fluid that may happen in the working cavity 25.

Also during the engagement of the cylinder 40, an optional switch 43 connected to a stop 44 at the push rod 22 can automatically initiate a calibration, for example, a "zero setting" at the electronic circuit 13 of pressure measurement device 8 via a cable 45 to allow precise pressure measurement up from zero.

Furthermore, a built in time delay prior to performing a "zero setting" allows the system time for the fluid to completely enter and stabilize the channel system before the zero setting is initiated.

Figure 6:
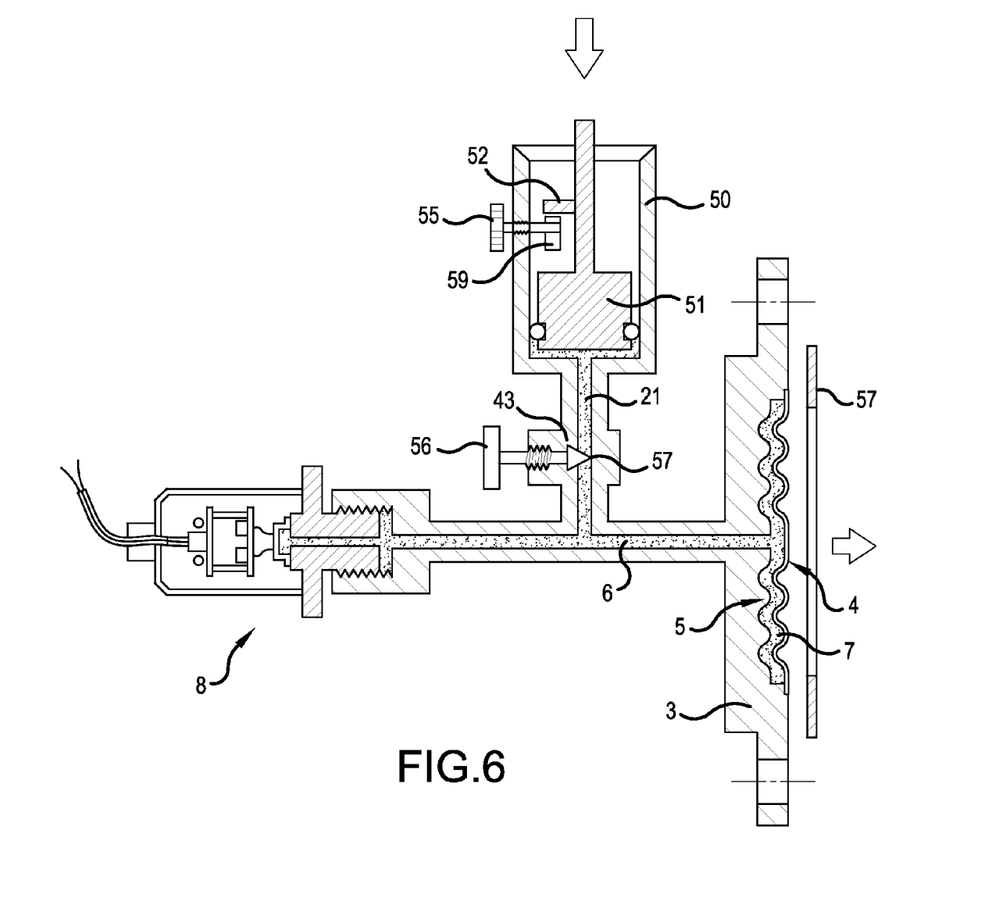
FIG. 6 illustrates the diaphragm seal assembly according to an embodiment of the present invention.

FIG. 6 illustrates an exemplary embodiment in that the active volume member 50 is controlled by a piston 51, which is driven by a second force, for example, by a magnet or motor or hydraulic piston or pneumatic piston and which is directly in contact with the fluid channel system of the measurement assembly.

A stroke downwards of the piston 51 will directly move the fluid from cylinder 50 through channel 21 and bore 6 to the cavity 7 formed behind the first diaphragm seal 4.

A stop 52 at the piston 51 will prohibit that too much volume is moved such that an accurate amount of fluid volume is provided. The stop is tunable by a placement of an eccentric buffer stop 54 which is adjustable by turning a handle 55.

A shut off needle valve 56 in channel connection 21 can be closed so that no influence or external influence is created during pressure measurement as described above.

Figure 9:
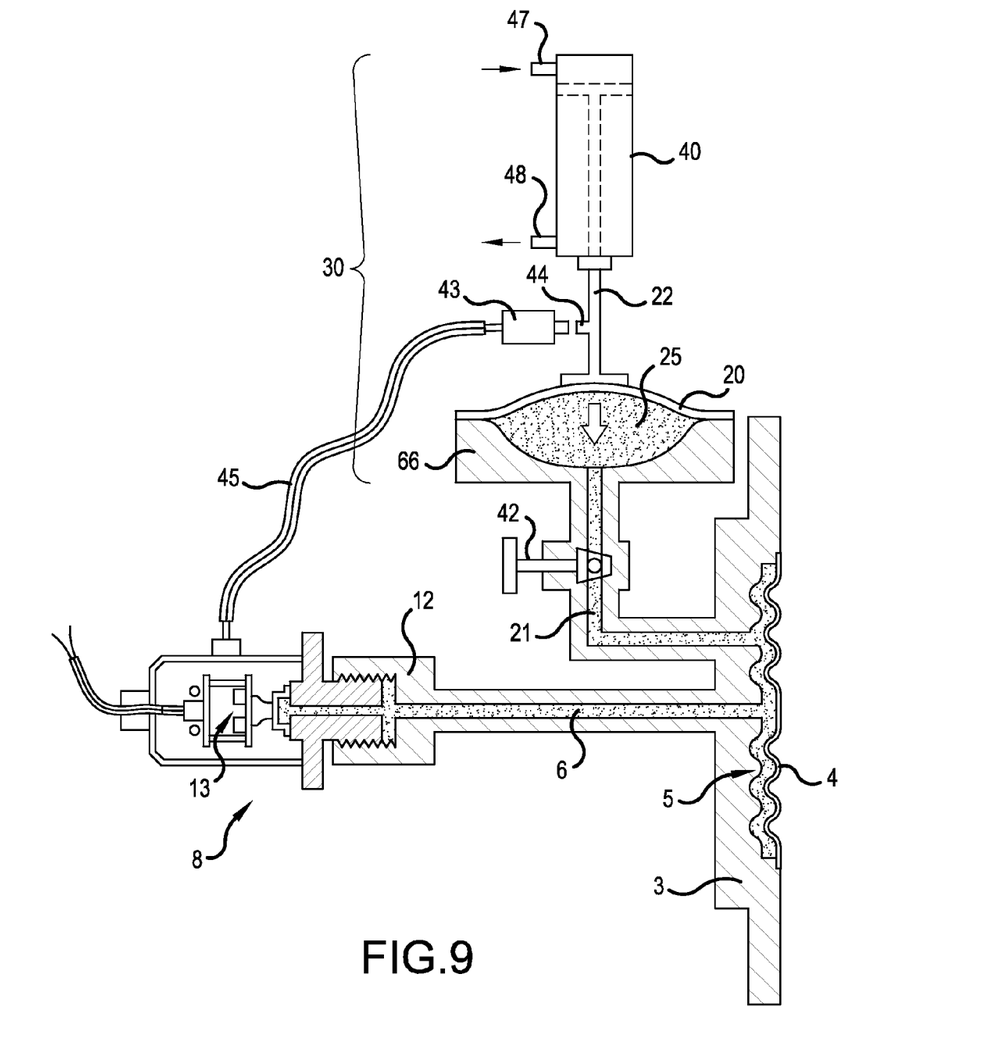
FIG. 9 illustrates the diaphragm seal assembly according to an embodiment of the present invention.

During the engagement of the cylinder 50, a switch 43, as illustrated in FIG. 9, connected to a stop 44/52 at the push rod 22 can automatically initiate a "zero setting" at the electronic circuit 13 of the pressure measurement device 8 via a cable 45 to allow precise pressure measurement up from zero.

Figure 7:
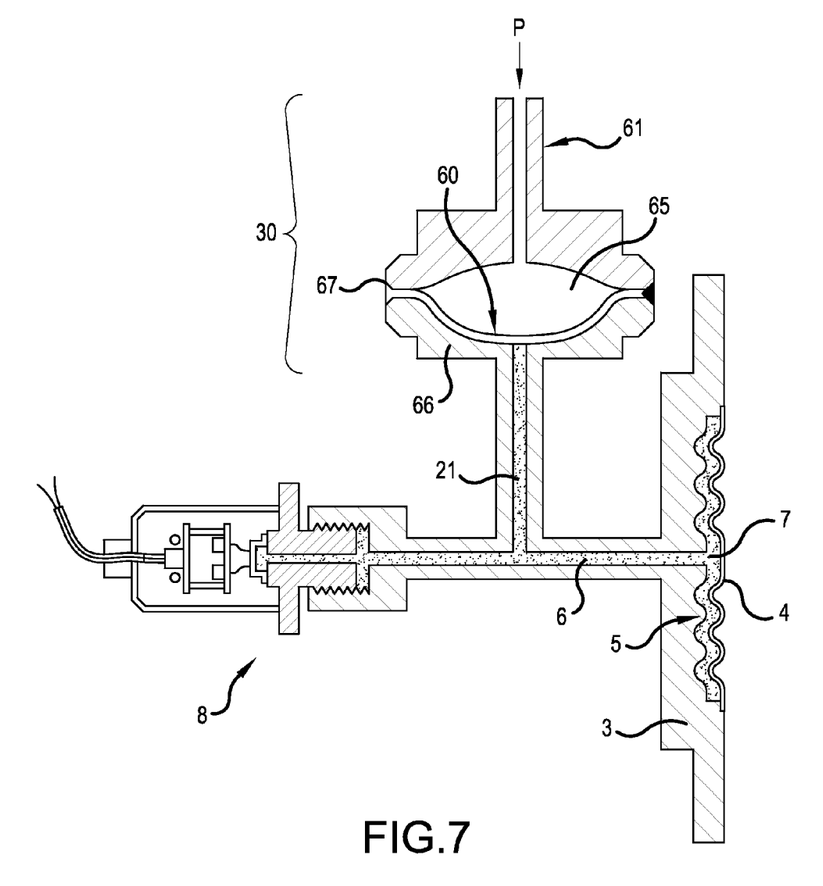
FIG. 7 illustrates the diaphragm seal assembly according to an embodiment of the present invention.

FIG. 7 illustrates an exemplary embodiment in that the active volume member 30 has a second diaphragm 60 that is operated by a fluid pressure source "P", for example, a pneumatic source, hydraulic source, etc., which source is connected via connection 61. In, for example, the case of a pneumatic system, the second diaphragm 60 can be connected to plant air or a pressure regulator to provide constant pressure to the second diaphragm 60. This constant pressure can be greater than a process pressure from the process containment to prevent mis-measurement. In other words, the pressure to the second diaphragm should be larger than a maximum of the process pressure in order to obtain accurate pressure readings.

The second diaphragm 60 can be made out of rubber, steel or stainless steel or any flexible material, and is sealed by surrounded welding 67 or with a sealing to a body 66.

Via pressure P substantially all of the fluid, or a predetermined portion thereof, will be pushed towards the first diaphragm seal 4 through the channel 21 and bore 6 to facilitate pressure measurement. Thus, as described above, the diaphragm seal 4 will be held in a position to transfer pressure to the pressure sensor assembly 8.

Figure 8:
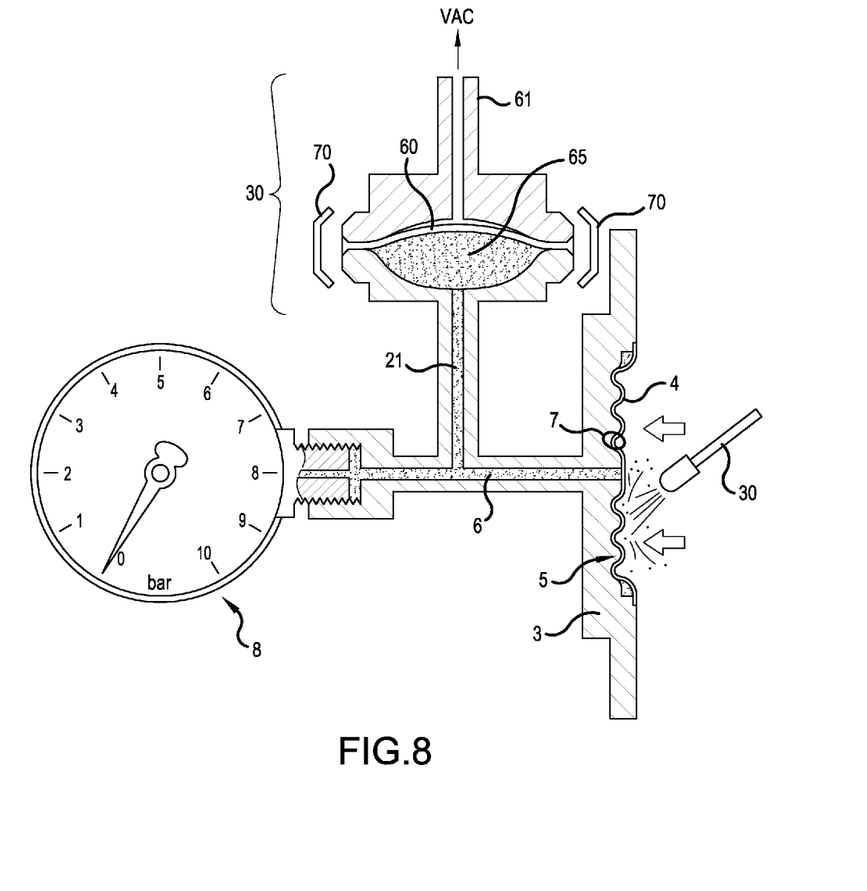
FIG. 8 illustrates the diaphragm seal assembly according to an embodiment of the present invention.

In FIG. 8, the assembly of FIG. 7 is shown in a parking position. The active volume member 30 during a parking position initiation needs to be operated in reverse such that the second diaphragm 60 is moved away from channel 21 in that the pressure P is shut off and vacuum "VAC", e.g. supplied by a venturi system, is used with the plant air to create the necessary vacuum and move the diaphragm 60 to a parked position, whereby the fluid is sucked out of the channel system and the cavity 7 between the first diaphragm seal 4 and seat 5. The benefit to this setup is, that with normal air pressure sources vacuum could be provided to have a stable parking position where the seal is securely parked in its seat.

As described previously, the first diaphragm seal 4 will be securely parked in its seat 5 for safe cleaning by e.g. water jet systems, pressure washers, etc.

In the previously described embodiments, which can be combined, the systems can be operated by remote actuation to allow switching from a control room or other automated systems.

Thus, the sensor or gauge can be optimized by setting after activating or changing the position of the active volume member 30 by setting the electronics to a zero (tare value) or setting the dial/pointer of a gauge to zero.

FIG. 9 illustrates an exemplary embodiment in which the second channel 21 is directly connected with the seat 5 of the flange 3 such that the second channel 21 is connected with the first channel 6 via the cavity produced between the seat 5 and the first diaphragm seal 4.

The housing associated with the second diaphragm 60 could be also made for easier service and manufacturing by two parts, which are clamped together with a clamp 70. For easier manufacturing the second diaphragm 60 could be also made of same material, shape or diameter as the process diaphragm 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pressure measurement system comprising:
   a pressure channel system fillable with a fluid;
   a pressure sensor or pressure gauge;
   a first diaphragm seal arranged between a process in a process containment and a seat formed in or connected to a flange, a cavity being formed between the first diaphragm seal and the seat when the pressure measurement system is in an active operation; and
   a volume member adapted to push the fluid from the pressure channel system into the cavity or suck the fluid from the cavity towards the pressure channel system, wherein the first diaphragm seal is moveable by displacing the fluid behind the first diaphragm seal by the volume member, wherein the pressure sensor or pressure gauge is connected to the pressure channel system and provides a pressure measurement of the process in the process containment based on a pressure of the fluid, and wherein the pressure channel system includes at least a first fluid channel and a separate, second fluid channel, the first fluid channel extending from the cavity to the pressure sensor or pressure gauge and the second fluid channel extending from the volume member to either the first fluid channel or the cavity.

2. The pressure measurement system according to claim 1, wherein the first diaphragm seal is set in the seat by the volume member to avoid deformations during cleaning.

3. A pressure measurement system comprising:
a pressure channel system fillable with a fluid;
a pressure sensor or pressure gauge;
a first diaphragm seal arranged between a process in a process containment and a seat formed in or connected to a flange, a cavity being formed between the first diaphragm seal and the seat when the pressure measurement system is in an active operation; and
a volume member adapted to push the fluid from the pressure channel system into the cavity or suck the fluid from the cavity towards the pressure channel system,
wherein the first diaphragm seal is moveable by displacing the fluid behind the first diaphragm seal by the volume member,
wherein the pressure sensor or pressure gauge is connected to the pressure channel system and provides a pressure measurement of the process in the process containment based on a pressure of the fluid and
wherein the volume member is a second diaphragm which is drivable by pressure or vacuum.

4. The pressure measurement system according to claim 1, wherein a predetermined and/or optimized working position of the first diaphragm seal is defined by a specified pressure, force or a specified piston position from the volume member.

5. A pressure measurement system comprising:
a pressure channel system filled with a pressure fluid;
a pressure sensor connected to the pressure channel system and providing a pressure measurement of a process in a process containment based on a pressure of the pressure fluid, the pressure channel system being connected to the process containment via a first channel;
a first diaphragm seal arranged between the process and the first channel; and
a second diaphragm seal arranged in a second channel that is fluidically connected with the first channel,
wherein in a first mode, the second diaphragm seal is moved into a first position thereby moving the first diaphragm seal via the pressure fluid into an active position such that the pressure sensor obtains a pressure reading of the process in the process containment, and
wherein in a second mode, the second diaphragm seal is moved into a second position thereby moving the first diaphragm seal via the pressure fluid into a parked position such that the first diaphragm seal is held against a seat formed between the first channel and the process containment, the seat having a majority of its area shaped corresponding to a shape of the first diaphragm seal.

6. The pressure measurement system according to claim 5, wherein a flange fixedly holds the seat to the first channel.

7. The pressure measurement system according to claim 6, wherein the flange is formed between the process containment and the first channel, and wherein the seat is formed in the flange.

8. The pressure measurement system according to claim 5, wherein a shut-off valve is formed in the second channel between the second diaphragm seal and the first channel, the shut-off valve isolating the second diaphragm seal from the first diaphragm seal and the pressure sensor.

9. The pressure measurement system according to claim 5, wherein a cylinder assembly, based upon an activation, moves the second diaphragm seal from the second position to the first position or from the first position to the second position.

10. The pressure measurement system according to claim 9, wherein the cylinder assembly includes a piston and a piston rod, the piston rod connecting the piston to the second diaphragm seal, and wherein the piston is moveable within the cylinder assembly to be in the first position or the second position.

11. The pressure measurement system according to claim 5, wherein a switch operatively engaged with a movement of the second diaphragm seal initiates a zero setting of the pressure sensor upon an activation thereof.

12. The pressure measurement system according to claim 11, wherein a time delay is set prior to the initiating of the zero setting of the pressure sensor such that upon initiating the zero setting, the second diaphragm seal is fully seated in the first position.

13. The pressure measurement system according to claim 12, wherein the time delay substantially corresponds to an amount of time required for the second diaphragm seal to traverse from an activation of the switch to being fully seated in the first position.

14. The pressure measurement system according to claim 11, wherein a stop activates the switch, and wherein the stop is arranged on a pushrod that is operatively engaged with the second diaphragm seal.

15. The pressure measurement system according to claim 5, wherein the process containment is a process containment for a brewery, dairy, creamery, chemical plant, or refinery.

16. The pressure measurement system according to claim 5, wherein the second diaphragm seal is moved from the first position to the second position or the second position or the first position based on a pneumatic or hydraulic force.

17. The pressure measurement system according to claim 5, wherein the pressure channel system is completely sealed.

18. The pressure measurement system according to claim 5, wherein the pressure fluid contained in the pressure channel system directly contacts a surface of the first diaphragm seal and a surface of the second diaphragm seal.

19. The pressure measurement system according to claim 5, wherein the first diaphragm seal and the second diaphragm seal are each connected to a first flange and a second flange, respectively, only in an area of an outer circumference of the first diaphragm seal or second diaphragm seal.

20. A pressure measurement system comprising:
a pressure channel system for transmitting a pressure of a fluid to a pressure sensor or pressure gauge;
a diaphragm for fluidly separating the pressure channel system from a process area, the diaphragm being seatable in a seat located opposite to a side of the diaphragm facing the process area;

a volume adjusting member that is fluidly connected to the pressure channel system and arranged for displacing the fluid in the pressure channel system, wherein the diaphragm is moveable by displacing the fluid in the pressure channel system by the volume adjusting member, and wherein the pressure channel system includes at least a first fluid channel and a separate, second fluid channel, the first fluid channel extending from a cavity, formed between the diaphragm and the seat, to the pressure sensor or pressure gauge and the second fluid channel extending from the volume adjusting member to either the first fluid channel or the cavity.

21. The pressure measurement system according to claim 20, wherein the diaphragm is seatable in the seat by displacing the fluid in the pressure channel system by the volume adjusting member.

22. A pressure measurement system comprising:

a pressure channel system for transmitting a pressure of a fluid to a pressure sensor or pressure gauge;

a diaphragm for fluidly separating the pressure channel system from a process area, the diaphragm being seatable in a seat located opposite to a side of the diaphragm facing the process area;

a volume adjusting member that is fluidly connected to the pressure channel system and arranged for displacing the fluid in the pressure channel system, wherein the diaphragm is moveable by displacing the fluid in the pressure channel system by the volume adjusting member, and wherein the volume adjusting member includes a movable volume adjusting diaphragm, which is movable by applying pressure to the volume adjusting diaphragm.

23. The pressure measurement system according to claim 21, wherein an optimized working position of the diaphragm in relation to the seat is adjustable via the volume adjusting member.

24. The pressure measurement system according to claim 20, wherein a surface of the diaphragm facing the seat is provided with a predetermined surface contour.

25. The pressure measurement system according to claim 20, further comprising a control device for controlling the volume adjusting member such that the diaphragm is set into a parking position in which the diaphragm is seated against the seat based on a detection of a predetermined pressure being exceeded in the process area, the predetermined pressure being determined in advance and stored in a memory.

* * * * *